United States Patent
Barinov

(10) Patent No.: US 9,172,804 B2
(45) Date of Patent: *Oct. 27, 2015

(54) METHOD OF DISTRIBUTED AGGREGATION IN A CALL CENTER

(71) Applicant: Genesys Telecommunications Laboratories, Inc., Daly City, CA (US)

(72) Inventor: Vitaly Y. Barinov, Clayton, CA (US)

(73) Assignee: GENESYS TELECOMMUNICATIONS LABORATORIES, INC., Daly City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/444,907

(22) Filed: Jul. 28, 2014

(65) Prior Publication Data

US 2015/0023491 A1 Jan. 22, 2015

Related U.S. Application Data

(63) Continuation of application No. 13/606,792, filed on Sep. 7, 2012, now Pat. No. 8,792,633.

(51) Int. Cl.
*H04M 3/00* (2006.01)
*G06F 15/16* (2006.01)
*H04M 3/51* (2006.01)
*H04M 3/523* (2006.01)

(52) U.S. Cl.
CPC .............. *H04M 3/51* (2013.01); *H04M 3/5234* (2013.01); *H04M 2203/40* (2013.01); *H04M 2203/402* (2013.01)

(58) Field of Classification Search
CPC . H04M 3/5175; H04M 3/523; H04M 3/5158; H04M 3/5183; H04L 67/02; H04L 67/10; G06F 9/5061
USPC ........... 379/265.01–265.02, 266.07; 709/218, 709/238
See application file for complete search history.

(56) References Cited

U.S. PATENT DOCUMENTS

| 7,526,540 B2 | 4/2009 | Gopisetty et al. |
| 2004/0044585 A1 | 3/2004 | Franco |
| 2012/0158995 A1 | 6/2012 | McNamee et al. |

OTHER PUBLICATIONS

J.Han and M.Kamber, "Data Mining: Concepts and Techniques", 2nd ed., Morgan Kaufmann Publishers, Mar. 2006, 772 pages.
Hyper-graph—Wikipedia, http://en.wikipedia.org/wiki/Hypergraph, as captured on Mar. 29, 2013, 8 pages.
"Multilevel Hypergraph Partitioning: Applications in VLSI Domain", by Karypis et. al, IEEE Transactions on Very Large Scale Integration (VLSI) Systems, vol. 7, No. 1, Mar. 1999, pp. 69-79.
Zoltan Developer's Guide: Quality Program; Zoltan Toolkit, http://www.cs.sandia.gov/zoltan/dev_html/dev_intro_sqe.html, as captured on Mar. 29, 2013, 6 pages.

*Primary Examiner* — Rasha Al Aubaidi
(74) *Attorney, Agent, or Firm* — Christie, Parker & Hale, LLP

(57) ABSTRACT

A method for partitioning a call center having N agents associated with M agent groups, for computation by a plurality of computational nodes, has steps for (a) assigning each agent as a vertex in a hypergraph; (b) assigning each agent group as a hyper-edge in the hypergraph; and (c) applying a hypergraph partitioning algorithm to partition the agents and groups relative to the nodes with the hypergraph cost function awarding equal load distribution to nodes and minimizing inter-node traffic.

11 Claims, 4 Drawing Sheets

METHOD OF DISTRIBUTED AGGREGATION IN A CALL CENTER

CROSS-REFERENCE TO RELATED APPLICATIONS

This application is a continuation of U.S. patent application Ser. No. 13/606,792, filed on Sep. 7, 2012, the disclosure of which is hereby incorporated by reference in its entirety.

BACKGROUND OF THE INVENTION

1. Field of the Invention

This invention is in the technical area of call centers, and pertains more particularly to creating statistics for a call center.

2. Description of Related Art

Call centers are typically organizations of telephone switches, computerized servers and agent stations inter-related by networks. The telephone switches are typically connected to Publically Switched Telephone Networks (PSTN), cellular telephone networks, and the Internet (for data-packet telephony). In a local call center most stations and computerized resources are inter-connected by a local area network (LAN), but there may also be more remote hardware and software resources, and agents as well interfacing by a wide area network, which may be the well-known Internet network.

Call center technology is a rapidly-growing field, and has been so for some time, so modern call centers can be very large organizations, encompassing hundreds or even thousands of agents manning agent stations, and handling tens of thousands of calls.

In operation of call centers it is vitally important to have at least near real-time information concerning the state of resources, such as agent activity and availability, calls in queue, and much more. This information is used to plan resource adjustment, pace operations and to enable many other functions.

In most call centers there is therefore an operation termed Stat-Server in the art, which is a term used to refer to a computerized server appliance, or a group of such appliances, network connected to the agent stations and many other servers inter-related in the call center. The Stat Server executes powerful software from a non-transitory physical medium, and the software provides functionality for accepting data from many other points in the call center, monitors many call center functions and status, and performs highly-structured computerized operations to maintain and report statistics and status of a wide variety of call center functions in near real time. These status reports and statistics are vital in operation of any call center, which would quickly fail without such functions.

It was described above that call centers have evolved to a point that a single call center may have thousands of agents and may handle tens of thousands of calls. Moreover, there are federations of call centers, interfaced, for example, over the Internet, and the trend is to ever larger and larger operations.

In earlier days of call center technology, where a call center might have, for example twenty agent stations, manned by agents to handle perhaps a few hundred calls per day, a Stat Server having a single processing unit (node) and moderate computer power, was adequate to provide the information needed to operate the call center successfully. With the present state of call center technology, parallel processing (multiple nodes) and quite sophisticated software is more and more necessary to provide the real-time information and data needed for successful operation.

With multiple node parallel processing, and the complicated structure of call centers and their complicated functionality, partitioning a call center for parallel processing becomes a necessity, and brings new problems, one of which is inter-node data traffic, which severely limits the real-time desire of Stat Server operations.

What is clearly needed are methods for partitioning that limit inter-node traffic and provide real time operation with minimum computing power.

BRIEF SUMMARY OF THE INVENTION

In an embodiment of the present invention a method for partitioning a call center having N agents associated with M agent groups, for computation by a plurality of computational nodes is provided, having steps for (a) assigning each agent as a vertex in a hypergraph; (b) assigning each agent group as a hyper-edge in the hypergraph; and (c) applying a hypergraph partitioning algorithm to partition the agents and groups relative to the nodes with the hypergraph cost function awarding equal load distribution to nodes and minimizing inter-node traffic.

In another embodiment there are further steps for (d) mapping each agent and group as an object O to one of K nodes by a Hash function $H:O \rightarrow [1,K]$, such that each node $H(O)$ is an owner for the object; (e) for each agent, computing the aggregates $AA\_1, \ldots, AA\_P$ locally by the associated owner node; and (f) computing aggregates $AA\_1, \ldots, AA\_P$ for each group shared by all K nodes by i) creating a partial state record (PSR) of the aggregates $AG\_j$ by Node i by aggregating on all agents, owned by node i and belonging to group G; and ii) sending PSRs to owner (G), which combines all PSRs into a total state record.

DETAILED DESCRIPTION OF THE INVENTION

Figure 1:
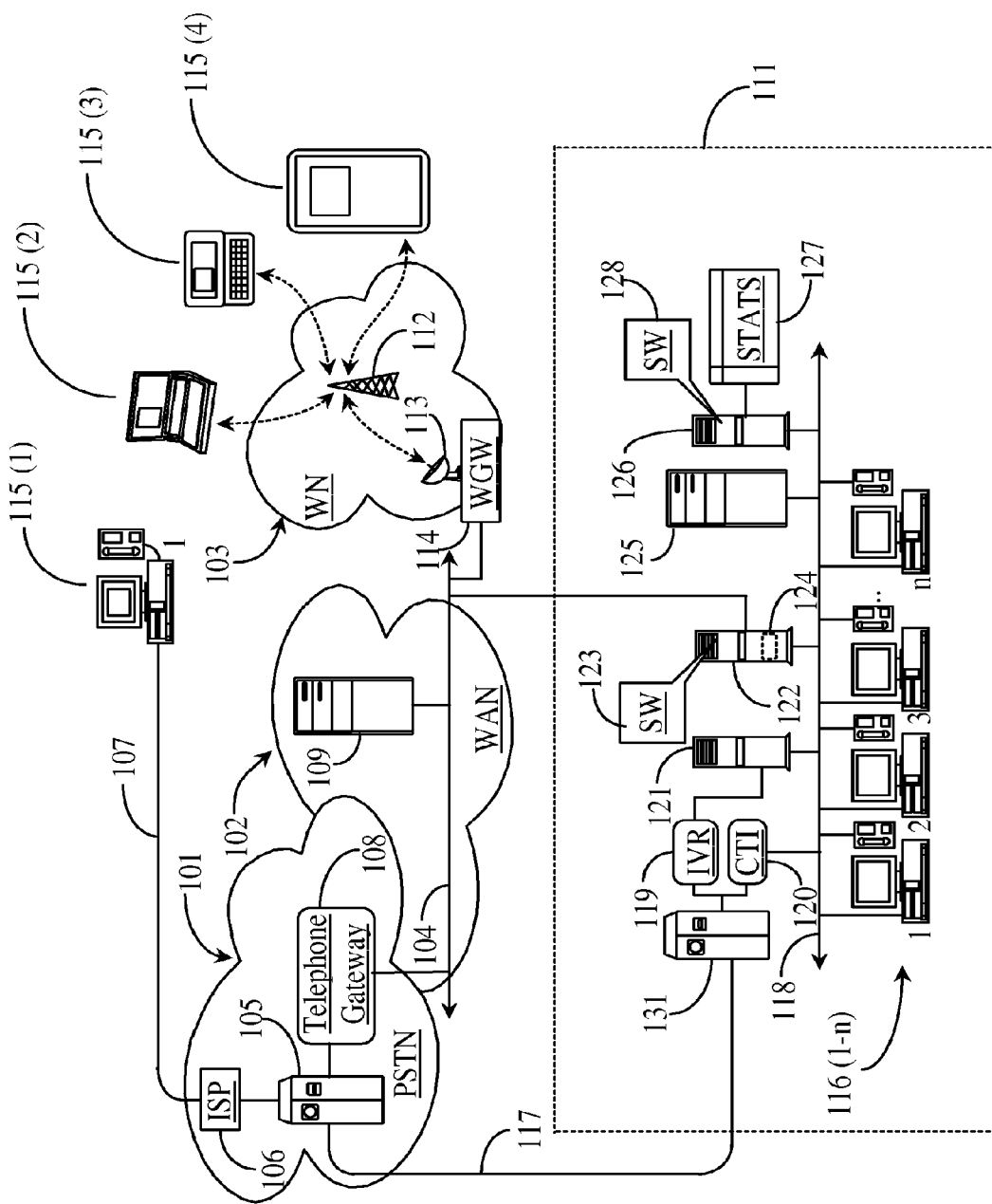
FIG. 1 is an exemplary architectural diagram of a network-connected system that includes a call center in an embodiment of the present invention.

FIG. 1 is an exemplary architectural diagram of a network-connected system that includes a call center 111 in an embodiment of the present invention. It is to be noted that this architecture is an example, and there are many perturbations that might be made. It is also to be noted that there may be several more call centers sharing traffic and distributing calls to agents, all under the purview of a single Stat Server 126 operation. This exemplary system comprises a wide-area-network (WAN) 102, a public-switched telephone network (PSTN) 101, and a wireless carrier network (WN) 103. PSTN 101 may be any publicly switched telephone network. WAN 102 may be a corporate or public WAN, and may be the well-known Internet network. Wireless network 103 may be any wireless carrier network and is typically a cellular telephony network.

WAN 102 is the Internet network in a preferred embodiment because of its high public access characteristic, and is referred to herein as Internet 102. Internet 102 is further exemplified by a network backbone 104 representing all of the lines, equipment, and connection points that make up the Internet as a whole. Therefore, there are no geographic limitations to the practice of the present invention.

Network backbone 104 in this example supports a web server 109, which may be hosted by any one of a wide variety of enterprises or organizations, and represents all web servers that may be instantiated in the Internet.

A call center 111 is illustrated in this example, built upon a local area network (LAN) 118 supporting various equipment and facilities for practicing call-center interaction processing. LAN 118 supports a plurality of call center agents dedicated to services for the host of the call center. Each call center agent in this example operates from an agent station 116 (1-n). Each agent station 116 (1-n) includes a LAN-connected computing appliance and a switch-connected telephone for illustrative purposes only, as the exact equipment types and operation may vary. The telephone capability at agent stations may be provided through the LAN as digital telephony, as shown in this example, or the telephones may be connected by Destination Number lines (not shown) to a PSTN switch connected, as is switch 131, to PSTN 101 by trunk 117.

PSTN 101 includes a network-level telephone switch 105, which may be an automated call distributor (ACD) or a private branch exchange (PBX), or some other type of telephony switching facility without departing from the spirit and scope of the present invention. Telephone switch 105 is connected to central office telephone switch 131 associated with the call center via telephony trunk 117. Switch 131 represents the last hop for callers before being routed to agent stations 116 (1-n) via telephone. Switch 105 in PSTN 101 has connection to network backbone 104 of the Internet network through a telephone gateway 108. Gateway 108 is adapted by software executing from a physical medium to facilitate cross conversion of telephony traffic from the PSTN to the Internet network and from the Internet over the PSTN network.

A variety of consumer appliances 115 (1-4) are illustrated in this example and are meant to include any appliances that may be used to access networks 102, 101, and 103. Appliance 115 (1) is a desktop computing appliance with a digital telephone and SW executing to enable the telephone. In an alternative embodiment the telephone may be a separate PSTN telephone connected by PSTN land-line to PSTN network 101.

A consumer operating equipment 115 (1) connects with computer 115 (1) to Internet 102 via PSTN land line 107, and an Internet service provider (ISP) 106, in this instance through gateway 108. The methods of connection may vary upon the equipment used and the available technical avenues for accessing the Internet. Cable modem, telephone modem, satellite, digital services line (DSL), broadband, and WiFi are just some of the available connection methods that may be used to gain access to Internet 102.

Consumer appliances 115 (2), 115 (3) and 115 (4) are wirelessly enabled to connect to network backbone 104 via a cell tower 112, a transceiver 113, and a wireless multimedia gateway (WGW) 114 for bridging communications between wireless network 103 and Internet 102. Consumer appliance 115 (2) is a Laptop computer and 115 (3) is a cellular telephone, such as an iPhone or an Android telephone. Computing appliance 115 (4) is an iPad type device. It may be assumed in this example, that each of the users operating appliances 115 (1-4) may initiate and manage telephone calls, multi-media transactions, emails, and web-browsing sessions.

LAN 118 in call center 111 supports a routing server 122 connected to Internet backbone 104 by way of an Internet access line. Routing server 122 includes a physical digital medium 124 that stores all of the data and software required to enable interaction routing. All transaction requests made by users from appliances 115 (1-4) are sent to routing server 122 for distribution to agents operating at agent stations 116 (1-n), managed by routing software that may employ many intelligent routing functions. Telephone switch 131 is enhanced for intelligent routing of voice interactions via a computer telephony integration (CTI) processor 120. CTI processor 120 is connected to switch 131 via a CTI link. CTI processor 120 provides intelligent control over switch 131. Telephone switch 131 also has an interactive voice response (IVR) capability via an IVR 119.

LAN 118 supports an application server 121 that may be employed for serving voice applications to callers. CTI processor 120 is connected to LAN 118 enabling service to the switch and other maintenance through CTI functionality. LAN 118 supports a messaging server 125 adapted with a physical digital medium containing all of the required software and data to enable function as a message server or router. LAN 118 also supports a statistics server (Stat Server) 126. Stat Server 126 includes a physical non-transitory digital medium comprising all of the software and data required to enable function as a Stat Server. The software of Stat Server 126 is represented as SW 128. Stat server 126 has connection to a data repository 127 adapted to store all call center statistics, including, for example, profiles regarding customers and clients of call center 111, and may also store profiles and statistics regarding agents associated with the call center. Stat Server 126, repository 127 and operating SW 128 is a central focus in an embodiment of the present invention.

Figure 2:
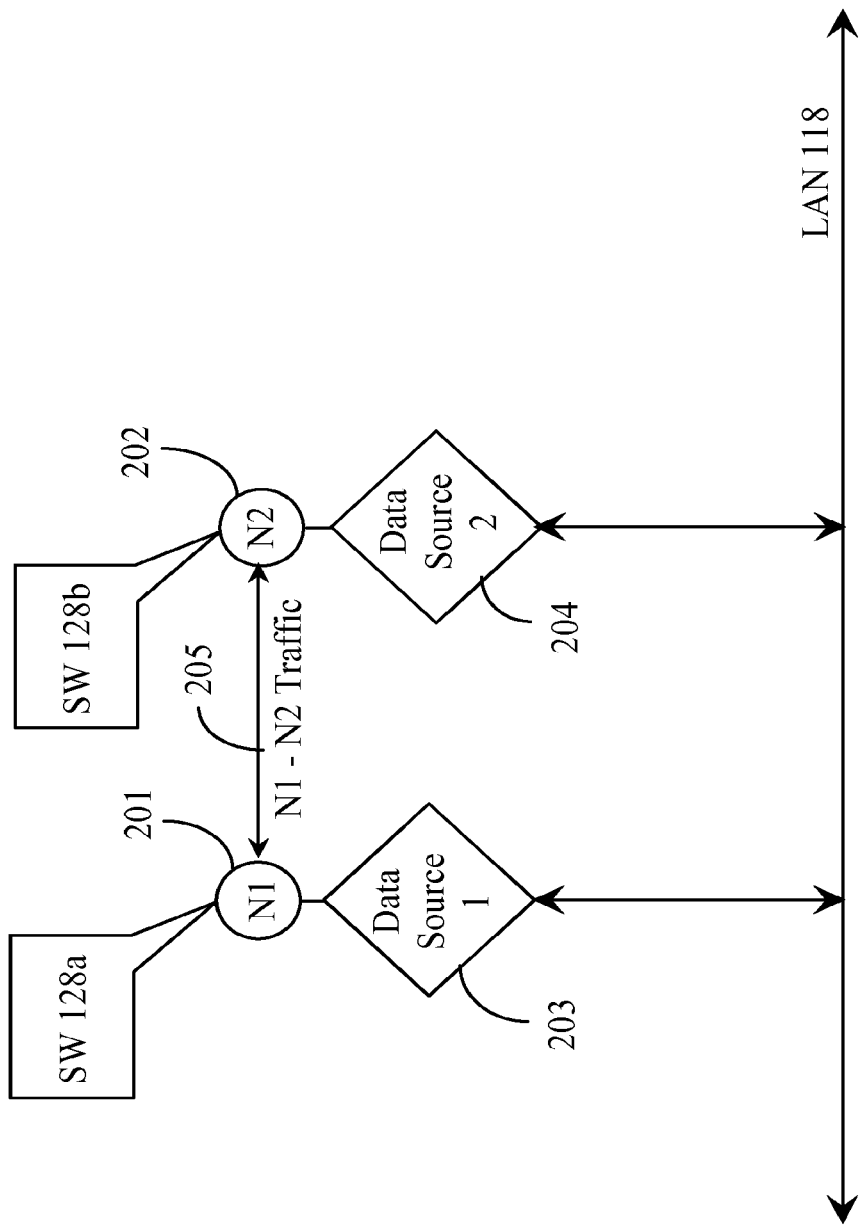
FIG. 2 is a simplified diagram illustrating connectivity of Nodes and Data sources in an embodiment of the present invention.

FIG. 2 is a simplified diagram illustrating connectivity of Nodes and Data sources in an embodiment of the present invention. Node 1 and Node 2 are shown connected by a data link 205, which can be any one of a number of known data paths. Nodes 1 and 2 communicate over this path as needed, but a goal of the present invention is to minimize inter-node traffic in this path. In this example Node 1 connects to a Data Source 1 (203) and Node 2 connects to a Data Source 2 (204), which in turn connect to a data network shown as LAN 118 in this example, but which might be a wide-area network such as the Internet, or another network. Data from the respective Data Sources is operated upon by processing nodes N1 and N2 in embodiments of the present invention, wherein Node 1 executes SW 128a and Node 2 executes SW 128b. These two software instances are a part of SW 128 indicated in FIG. 1, and may be similar or quite different.

In embodiments of the present invention the call center is partitioned, and objects, such as agents and agent groups, are associated by configuration with one or more nodes. So computations using incoming data to produce statistics regarding one set of agents, for example, may be accomplished by Node 1, and computations regarding another set of agents may be performed by Node 2. Depending upon the sophistication of configuration there may be a great deal of inter-node traffic. If configuration is good there may be moderate inter-node traffic, and if configuration is excellent, there may be very little inter-node traffic. Inter-node traffic is in general undesirable, because it requires time and computing power to accomplish.

In an embodiment of the present invention a simplified model of the contact center is treated, which consists of N agents and M agent-groups. This is simplified because it treats only of agents and agent groups, and the method of the invention is applicable in other embodiments to other objects in the contact center.

It is well known that in a modern call center agents are typically grouped into functional groups. One group, for example, may be dedicated to responding to connections made in outbound campaigns, while another may be dedicated to incoming calls regarding technical support for a particular class of products. Incoming callers may be screened by IVR119 (FIG. 1) and calls routed to agents in particular groups as agents become available according to the callers purpose or need. It is usual for an agent to be a part of more than one group, so the relationship between agents and groups is many-to-many.

Figure 3:
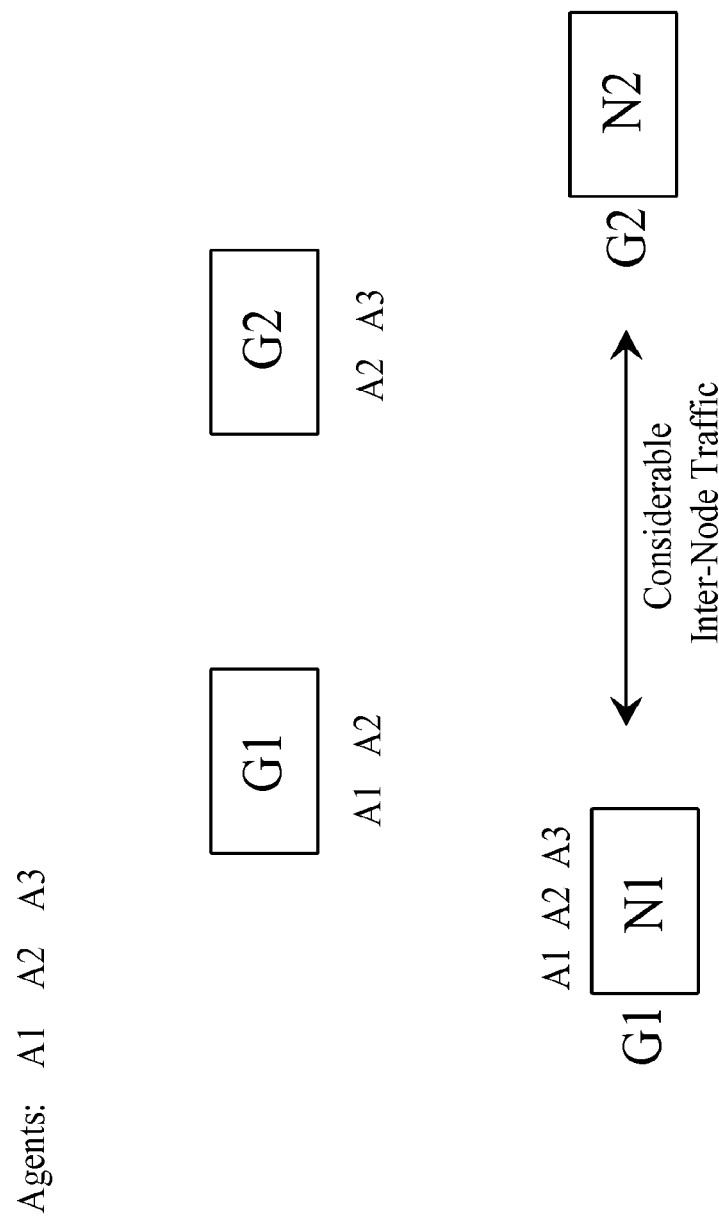
FIG. 3 is represents a simplified case of three agents, two agent groups and two nodes in an embodiment of the invention.

FIG. 3 represents a simplified case of three agents (A1, A2 and A3), two agent groups (G1 and G2) and two nodes N1 and N2. The relationship between agents nodes is typically physical, so all three agents may be associated with N1. In that case N2, processing stats for G2, must collect information regarding all three agents from N1, and inter-node traffic will be considerable.

The skilled artisan will understand that in this architecture there may be hundreds or even thousands of agents, dozens of groups, and a plurality of nodes. The goal is to partition the call center in such a way to minimize inter-node traffic and provide real-time stats.

In operation there is a set of aggregates $AA\_1, \ldots, AA\_P$ to be computed for each agent, and a set of aggregates $AG\_1, \ldots, AG\_S$ to be computed for each agent-group. It is assumed that at least all agent-group aggregates will be distributive or algebraic, so that it will be possible to efficiently compute the aggregates in the distributed system. More information on this aspect is referenced from [1] J. Han and M. Kamber, "Data Mining: Concepts and Techniques", 2nd ed., Morgan Kaufmann Publishers, March 2006.

If N and M are above a certain threshold it is not computationally feasible to calculate the aggregates in the single node. This is where call center technology has evolved, so it is necessary to partition the contact center. It is desired to spread all agents between K communicating nodes of the distributed system, so that each node performs computations at least approximately the same rate, which will minimize inter-node traffic.

In an embodiment of the present invention the contact center is modeled as a hyper-graph. Hypergraphs are defined generally in the Internet encyclopedia tool Wikipedia (for example, under the Hypergraph article). In an embodiment of the invention each agent is considered a vertex with the unit weight (or more general weight W=f(complexity $(AA\_1), \ldots,$ complexity$(AA\_P)$)). An agent-group (Group_i) is considered the hyper-edge (AGENT_i_1, AGENT_i_L).

In terms of hyper-graphs, the problem is the problem of multilevel hyper-graph partitioning, described fully in "Multilevel hypergraph partitioning: applications in VLSI domain", by Karypis et. al, March 1999, IEEE Transactions on Very Large Scale Integration (VLSI) Systems 7 (1), pp. 69-79, with cost function awarding equal load distribution and minimizing the inter-node traffic, which can be efficiently solved using existing software packages as may be derived from [4] Zoltan Toolkit, available at the Internet web site for the Sandia National Laboratories Computing Research (for example, under the Zoltan directory).

The two references mentioned above are listed again here:
[1] J. Han and M. Kamber, "Data Mining: Concepts and Techniques", 2nd ed., Morgan Kaufmann Publishers, March 2006
[3] "Multilevel hypergraph partitioning: applications in VLSI domain", by Karypis et. al, March 1999, IEEE Transactions on Very Large Scale Integration (VLSI) Systems 7 (1), pp. 69-79
Both references are incorporated in the instant specification at least by reference.

After the Contact Center hyper-graph is partitioned, the aggregation is performed as follows.

Each object (agent or group) is mapped to a node using hash function $$H:O \to [1,K]$$

We call node H(O) an owner for the object O. Each node can easily determine the owner for any object, using this completely decentralized logic. For each agent, the aggregates $AA\_1, \ldots, AA\_P$ are computed in straight-forward manner locally by owner node. The computation of aggregates $AG\_1, \ldots, AG\_S$ for each group Group_i is, in general, shared by all K nodes as follows:

Node i maintains partial state record (PSR) of the aggregate AG_j by aggregating on all agents, owned by node i and belonging to group G. Then, PSR is sent to owner(G), which combines all PSRs into total state record (which is possible because of the aggregates being distributive/algebraic). The traffic minimization embedded into cost function encourages placing all agents of a given group into the same node (partition), so in the ideal case there is almost no inter-node traffic (one node computes the single PSR and sends it to owner node).

Figure 4:
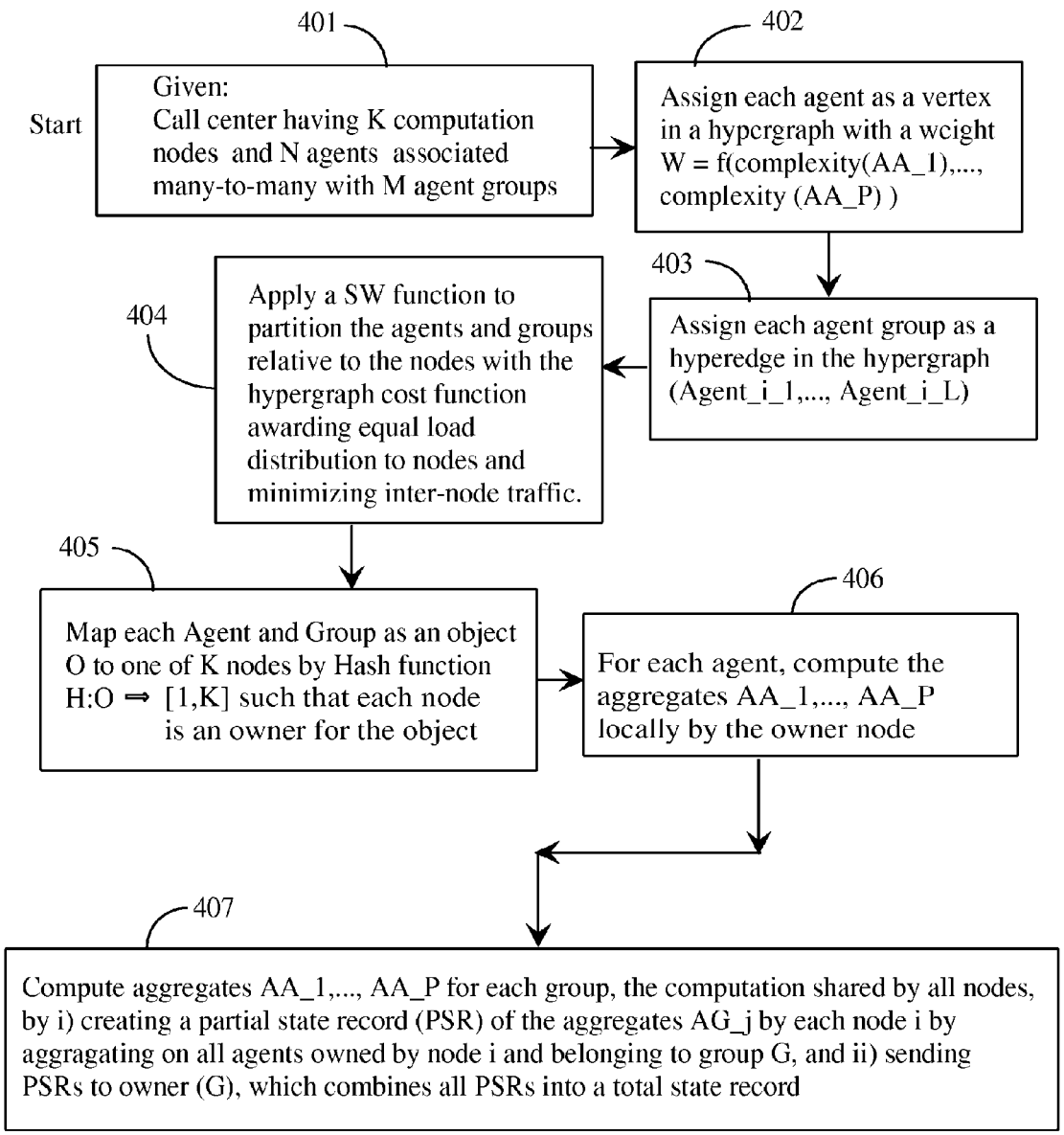
FIG. 4 is a process flow chart illustrating steps in practice of the invention in one embodiment.

FIG. 4 is a process flow chart depicting steps in the procedure in an embodiment of the invention for partitioning a call center using a hypergraph technique. A starting point is illustrated as element 401. At step 402 each agent is assigned as a vertex in a hypergraph with a weight W=f (complexity $(AA\_1), \ldots,$ complexity $(AA\_P)$). At step 403 each agent group is assigned as a hyperedge in the hypergraph (Agent_i_1, ..., Agent_i_L).

At step 404 a software function known for the hypergraph is applied to partition the agents and groups relative to the nodes with the hypergraph cost function awarding equal load distribution to nodes and minimizing inter-node traffic. At step 405 each agent and group is mapped as an object O to one of K nodes by Hash function $H:O \to [1,K]$, such that each node is an owner for the object. At step 406 aggregates $AA\_1, \ldots, AA\_P$ are computed for each agent locally by the owner node. Finally, at step 407 aggregates $AA\_1, \ldots, AA\_P$ are computed for each group with the computation being shared by all nodes. Each node i creates a partial state record of the aggregates AG_j by aggregating all agents owned by node I and belonging to group G, and sending PSRs to owner (G), which combines all PSRs into a total state record.

It will be apparent to the skilled artisan that the embodiments described are exemplary, and intentionally generalized to avoid undue complication in description. It will also be apparent to the skilled person that many alterations might be made in the embodiments described without departing from the invention, and that would be covered by the claims and enabled by the specification and drawings.

The invention claimed is:

1. A system for partitioning a call center having N agents associated with M agent-groups, for computation by K computational nodes, the system comprising:

a processor; and
a non-transitory physical medium, wherein the medium has instructions stored thereon that, when executed by the processor, causes the processor to:
assign each agent of the N agents as a vertex in a hypergraph;
assign each agent group of the M agent groups as a hyper-edge in the hypergraph;
apply a hypergraph partitioning algorithm configured to partition the N agents and M groups among the K nodes with a hypergraph cost function configured to balance load distribution among the nodes and minimize traffic between the nodes;
map each agent and group as an object O to one of the K nodes by a Hash function H:O→[1,K], such that each node H(O) is an owner for the object O; and
for each agent A, compute agent aggregates $AA\_1, \ldots, AA\_P$ locally by the associated owner node H(A).

2. The system of claim 1, wherein the medium has instructions stored thereon that, when executed by the processor, further causes the processor to for each group G, compute group aggregates $AG\_1, \ldots, AG\_S$ using respective agent aggregates $AA\_1, \ldots, AA\_P$ for each agent belonging to group G.

3. The system of claim 2, wherein the medium has instructions stored thereon that, when executed by the processor, further causes the processor to compute the group aggregates by:
creating a partial state record (PSR) of each of the group aggregates $AG\_j$ by node i by aggregating the agent aggregates $AA\_1, \ldots, AA\_P$ for each of the agents owned by node i and belonging to group G; and
sending the PSRs to the associated owner node H(G), which combines all the PSRs into corresponding total state records of the group aggregates.

4. A method for partitioning a contact center having N agents associated with M agent-groups, for computation by K computational nodes, the method comprising:
generating, by a processor, a hypergraph with N vertices corresponding to the N agents and M hyperedges corresponding to the M agent-groups;
partitioning, by the processor, the hypergraph into K partitions corresponding to the K nodes based on a function configured to balance load distribution among the nodes and minimize traffic between the nodes; and
using, by the processor, the partitioning to assign each of the agents to a corresponding one of the nodes, each node of the computation nodes being configured to compute agent aggregates for each of the agents assigned to the node.

5. The method of claim 4 further comprising assigning, by the processor, a weight to each vertex of the N vertices, the vertex corresponding to an agent of the N agents, the weight being based on a computational complexity of the agent aggregates of the agent.

6. The method of claim 4 further comprising using, by the processor, the partitioning to assign each of the agent-groups to a corresponding one of the nodes, each node of the computational nodes being further configured to compute group aggregates for each of the agent-groups assigned to the node.

7. The method of claim 6, wherein each node of the computational nodes is further configured to:
compute partial group aggregates corresponding to the group aggregates of each agent-group of the agent-groups by aggregating the agent aggregates for each of the agents assigned to the node and belonging to the agent-group; and
send each partial group aggregate of the partial group aggregates to a respective one of the nodes corresponding to the agent group.

8. A system for partitioning a contact center having N agents associated with M agent-groups, the system comprising:
a processor; and
a non-transitory physical medium, wherein the medium has instructions stored thereon that, when executed by the processor, causes the processor to:
generate a hypergraph with N vertices corresponding to the N agents and M hyperedges corresponding to the M agent-groups;
partition the hypergraph into K partitions corresponding to K computational nodes based on a function configured to balance load distribution among the nodes and minimize traffic between the nodes; and
use the partitioning to assign each of the agents to a corresponding one of the nodes, each node of the computational nodes being configured to compute agent aggregates for each of the agents assigned to the node.

9. The system of claim 8, wherein the instructions, when executed by the processor, further cause the processor to assign a weight to each vertex of the N vertices, the vertex corresponding to an agent of the N agents, the weight being based on a computational complexity of the agent aggregates of the corresponding agent.

10. The system of claim 8, wherein the instructions, when executed by the processor, further cause the processor to use the partitioning to assign each of the agent-groups to a corresponding one of the nodes, each node of the computational nodes being further configured to compute group aggregates for each of the agent-groups assigned to the node.

11. The system of claim 10, wherein each node of the computational nodes is further configured to:
compute partial group aggregates corresponding to the group aggregates of each agent-group of the agent-groups by aggregating the agent aggregates for each of the agents assigned to the node and belonging to the agent-group; and
send each partial group aggregate of the partial group aggregates to a respective one of the nodes corresponding to the agent group.

\* \* \* \* \*